Oct. 17, 1944. H. TUTIYA 2,360,375
ARRANGEMENT FOR ELECTRICALLY CONTROLLING OPERATION OF MACHINE TOOLS
Filed Dec. 10, 1940 4 Sheets-Sheet 2

INVENTOR.
H. Tutiya
BY:
Glascock Downing & Seebold
ATTORNEYS

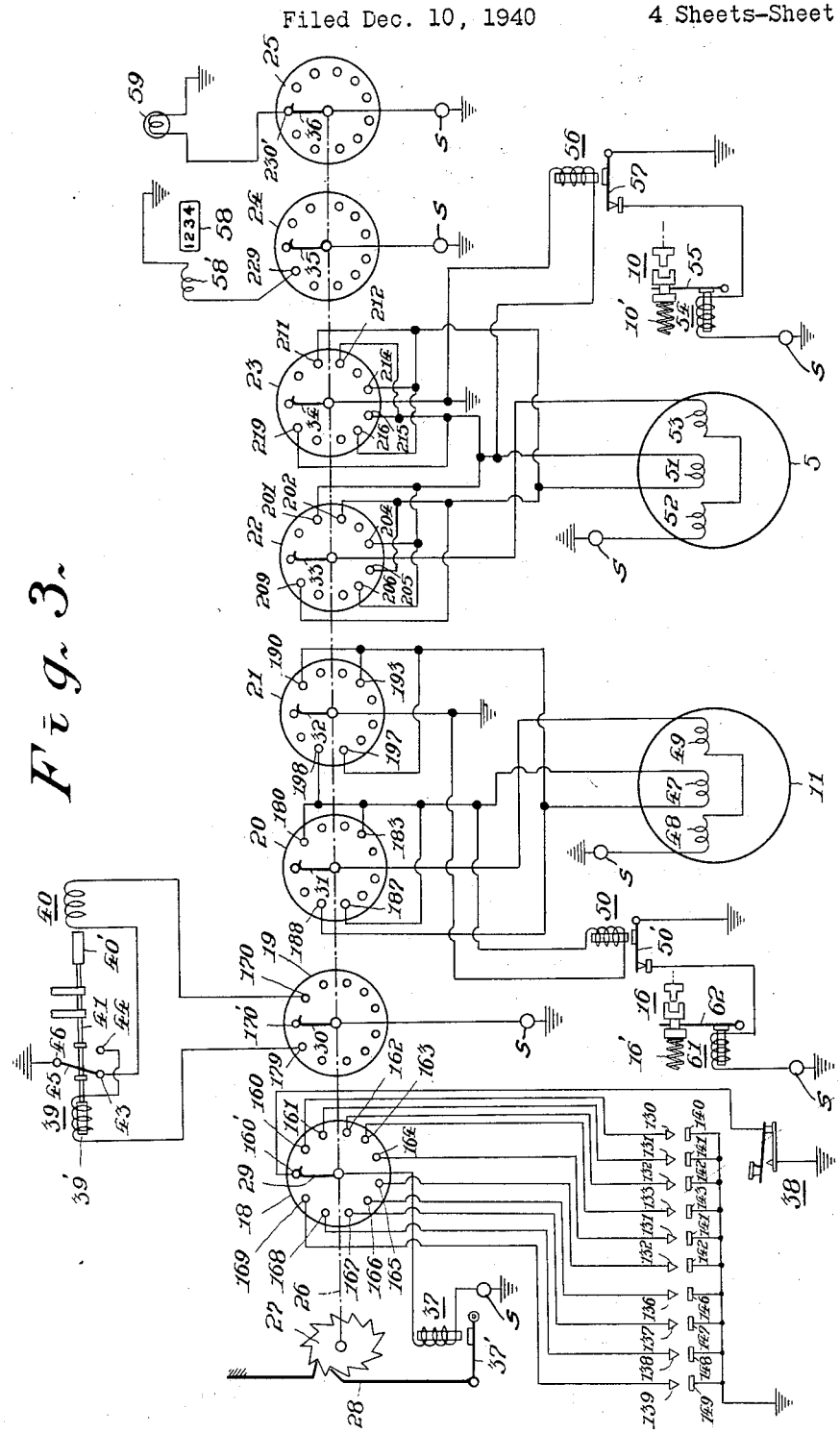

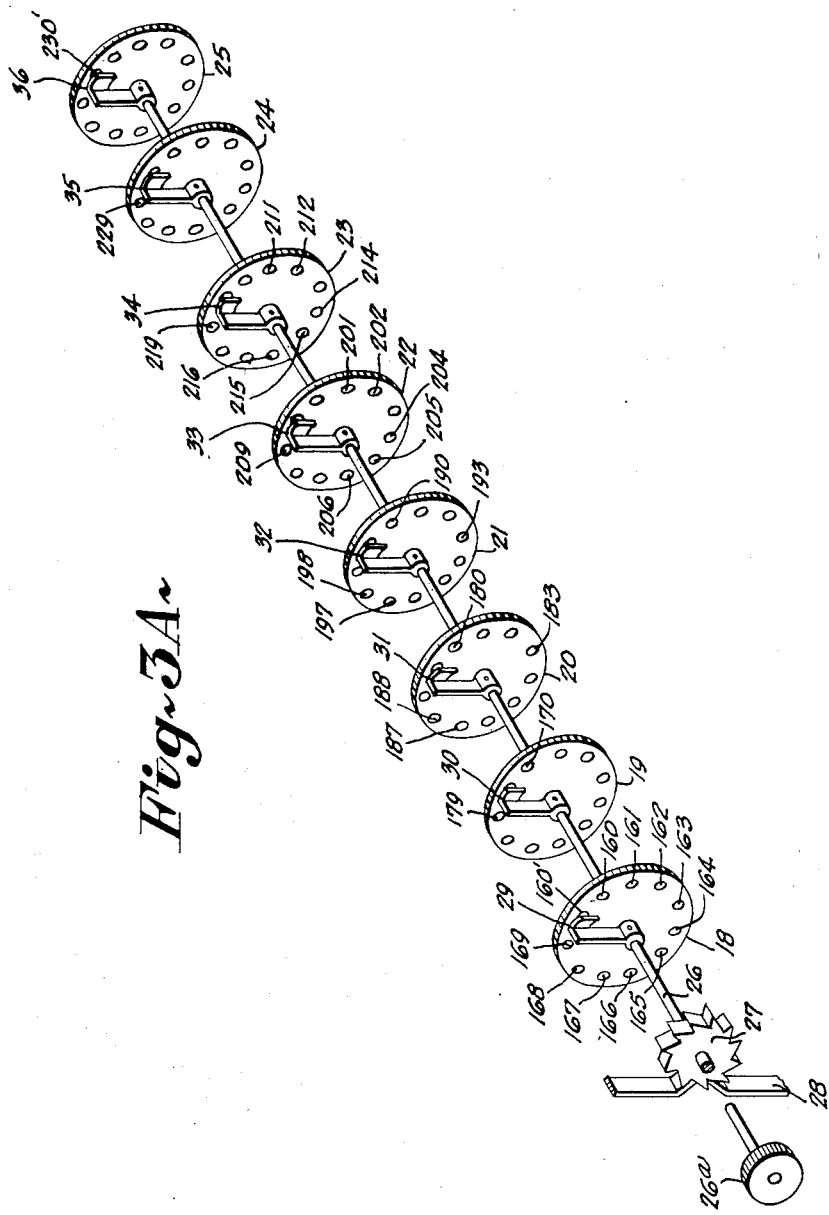

Patented Oct. 17, 1944

2,360,375

UNITED STATES PATENT OFFICE 2,360,375

ARRANGEMENT FOR ELECTRICALLY CONTROLLING OPERATION OF MACHINE TOOLS

Hidezo Tutiya, Tokyo-si, Japan; vested in the Alien Property Custodian

Application December 10, 1940, Serial No. 369,503
In Japan June 25, 1940

5 Claims. (Cl. 82—14)

This invention relates to an arrangement for electrically controlling operation of machine tools and has for its object to automatically control the operation of machine tool so as to work up a workpiece of material to a predetermined measure and shape.

While a detailed description of the operation of the various parts of the machine for eleven successive positions of the contactors will be given, it is to be understood that a different sequence of operations could be easily employed. From the foregoing description, it will be seen that the parts of the controls are set for turning or cutting a finished product of a particular shape. To cut or turn such a product, it is necessary to move a tool holder back and forth along a rotating workpiece, and also move the tool holder toward and away from the workpiece to cut the latter the desired depth. In other words, the tool holder is moved back and forth along two paths disposed substantially at right angles to each other.

The present disclosure contemplates (1) the moving of the tool holder transversely of the machine and parallel to the rotating workpiece to cutting position, (2) then moving the tool holder towards the workpiece to cross-cut the desired depth, (3) then reversing or moving the tool holder away from the workpiece, (4) then effecting a second transverse movement of the tool holder to a second cutting position, after which the previous forward and reverse cross-cut movements are repeated according to the adjustments of the machine. For each movement of the tool holder, a different set of circuits is required. The present invention provides means whereby these circuits will be automatically established and broken in the desired sequence so that the workpiece will be cut or turned into a finished product of a predetermined shape.

The accompanying drawings illustrate the invention, as applied to an engine lathe when turning a workpiece of material by way of example, in which Fig. 1 is a plan view;

Fig. 3 is a diagrammatic view of switching means with associated parts; and

Fig. 3A is a perspective view of the switching mechanism disclosed in the central portion of Fig. 3.

Figure 1:
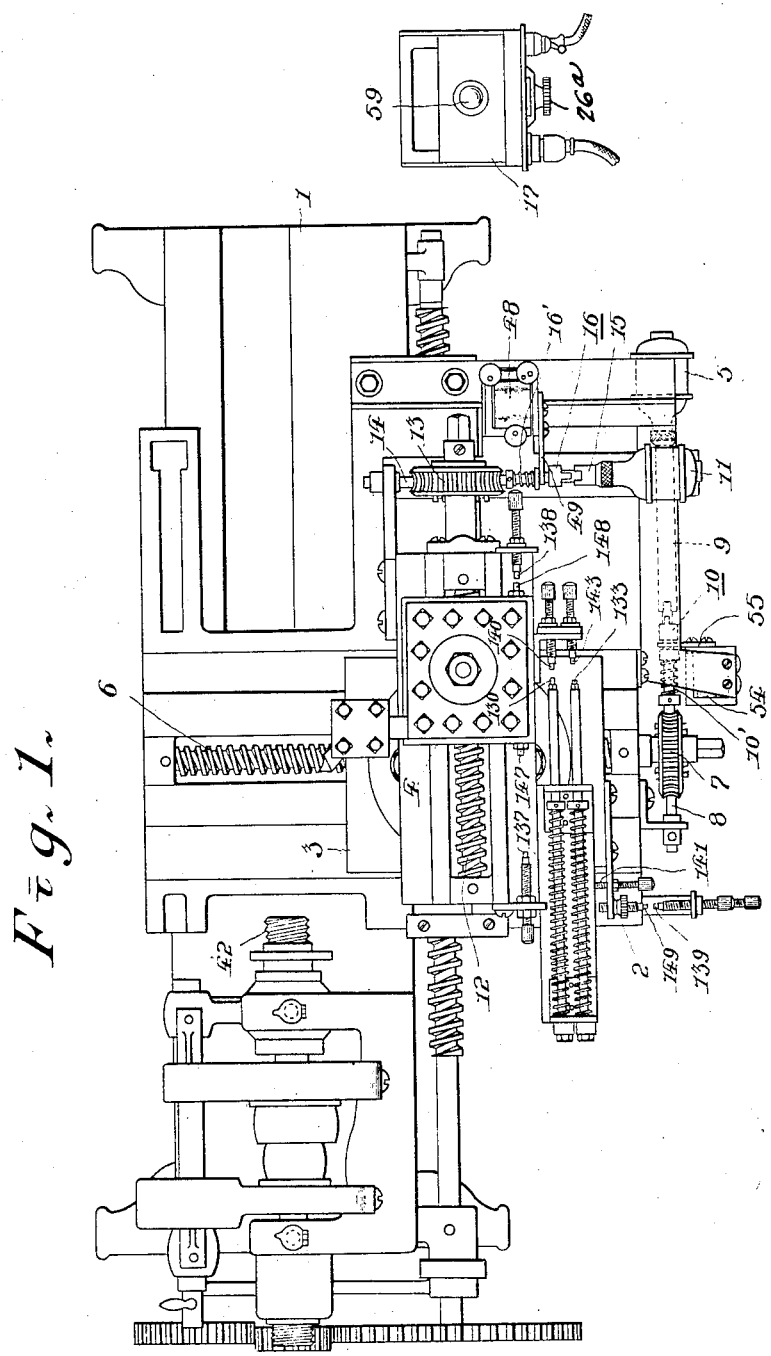
Figure 2:
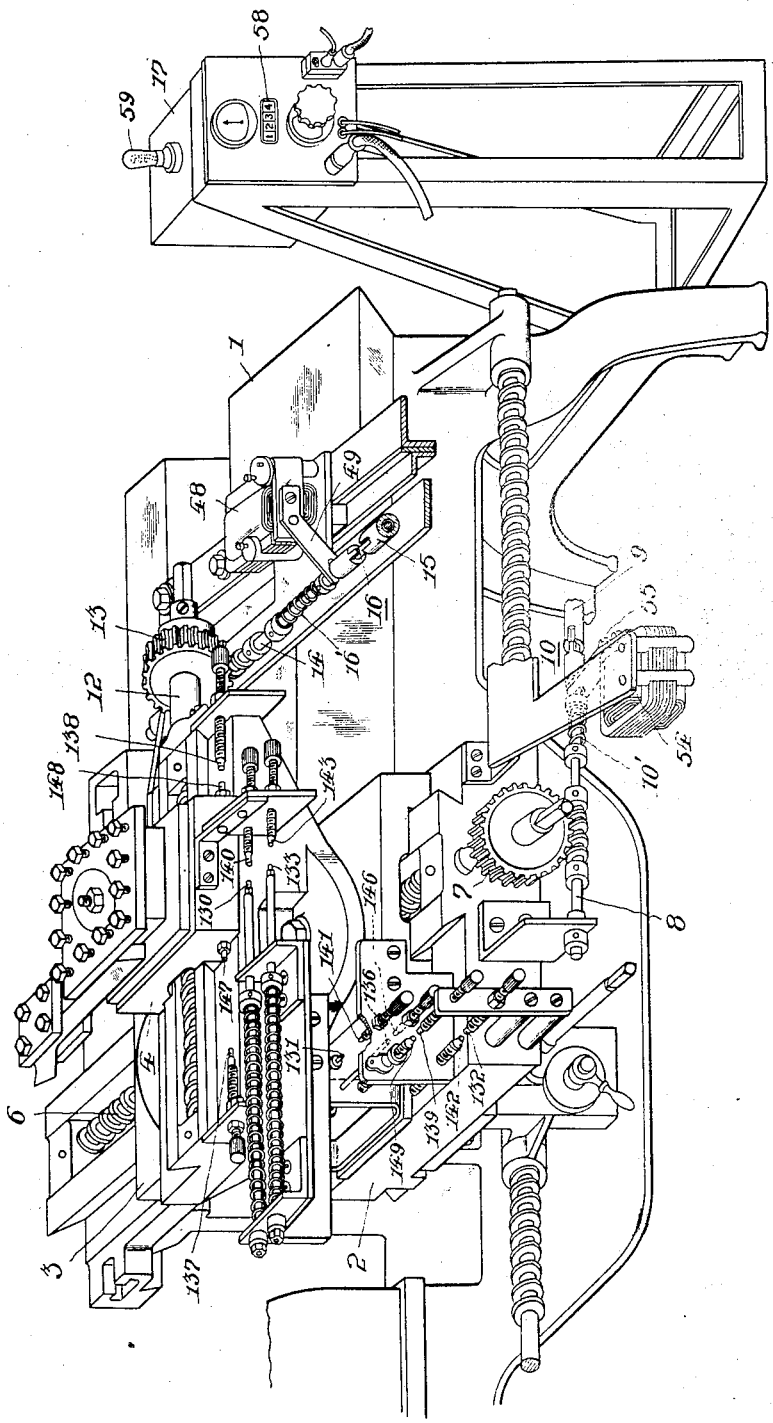
Fig. 2 is a perspective view of Fig. 1 with the lathe partly broken away.

Referring to Figs. 1 and 2, the bed of the lathe is indicated at 1, the carriage at 2, the cross slide at 3, and the tool post at 4. The cross slide 3 is arranged to be moved back and forth with the tool post 4 by an electric motor 5, which motor is drivable in either direction and supported on the carriage 2 or associated part by any suitable means, such as brackets. The driving connection between the motor 5 and slide 3 comprises the cross feed shaft 6, a worm wheel 7 secured on one end of the cross feed shaft 6 and a worm shaft 8 adapted to mesh with the worm wheel 7 and to be connected and disconnected with the shaft 9 of the motor 5 by means of a clutch device 10. The tool post 4 is arranged to be transversely moved by an electric motor 11, which motor is drivable in either direction and supported on the cross slide 3 or associated part by any suitable means, such as brackets. Tool part 4 is driven by motor 11 through the feed shaft 12, a worm wheel 13 secured on one end of the feed shaft 12, and a worm shaft 14 adapted to mesh with the worm wheel 13 and to be connected and disconnected with the motor shaft 15 by means of a clutch device 16.

A number of contact maker sets, each consisting of a stationary contact element and a movable contact element, is provided for controlling the circuits of the motors 5 and 11 to control the movement of the cross slide 3 and the tool post 4, as will be described later. The stationary contact elements and the movable contact elements of the contact maker sets are indicated at 130 and 140, 133 and 143, 137 and 147, 138 and 148, 131 and 141, 132 and 142, 136 and 146 and 139 and 149 respectively. The stationary contact elements 130, 133, 137 and 138 are mounted on the cross slide 3 or associated part and suitably insulated therefrom, while the cooperative movable contact elements 140, 143, 147 and 148 are conductively mounted on the tool post 4, or associated part through suitable means, such as suitable brackets. The stationary contact elements 131, 132, 136 and 139 are mounted on the carriage 2 or associated part and suitably insulated therefrom, while the cooperative movable contact elements 141, 142, 146 and 149 are conductively mounted on the cross slide 3 or associated part through suitable means, such as suitable brackets. The stationary contact members 130 and 133 are shown as mounted yieldingly through means of springs as seen in Figs. 1 and 2 of the drawings. One contact element of each of the other contact maker sets may be similarly mounted, if desired. The contact elements 137, 140, 143, 138, 141, 146, 139 and 132 are adjustably mounted and connected to the positive side of a current source S by conductors through switching means enclosed in a casing 17, while the body of the lathe is connected direct to the negative side of the current source by a conductor for the purpose as will be described later.

It must be noted that the contact maker sets must be arranged and adjusted in accordance with the measure and shape to which a workpiece or material is to be turned, as will be seen later.

The switching means are diagrammatically shown in Figs. 3 and 3A with associated circuits and appliances. There are provided eight switching discs 18, 19, 20, 21, 22, 23, 24 and 25 of an insulating material, each with eleven contact pieces, some of which are given reference numerals 160', 160, 161, 162, 163, 164, 165, 166, 167, 168, 169, 179, 170, 180, 183, 187, 188, 190, 193, 197, 198, 202, 204, 206, 209, 211, 212, 214, 215, 216, 219, 229 and 230' in the drawings.

A shaft 26 rotatably extends through the center of the switching discs and has a ratchet wheel fixedly mounted thereon, said wheel having the same number of teeth therein as the number of contact pieces, that is, eleven teeth in this case. A spring pawl 28 engages the ratchet wheel teeth. Contactors 29, 30, 31, 32, 33, 34, 35 and 36 are fixedly mounted on shaft 26 in a position opposite the front face of the switching discs 18, 19, 20, 21, 22, 23, 24 and 25 respectively to cooperate with the contact pieces on each disc. A control knob 26a is fixed upon shaft 26. This knob may be employed for manually setting the controls.

The pawl 28 is actuated by means of an electromagnetic coil 37. One side of coil 37 is connected to the positive side of the current source S and the other side is connected to the contactor 29 of the switching disc 18.

The contact piece 160' on switching disc 18 is arranged so that it may be grounded to the body of the lathe or connected to the negative side of the current source by means of a key 38, the body of the lathe being connected to the negative side of the source by a conductor, as hereinbefore stated. The contact pieces 160 to 169 may be grounded to the body of the lathe or connected to the negative side of the current source S by means of the contact maker sets 130 and 140, 131 and 141, 132 and 142, 133 and 143, 136 and 146, 137 and 147, 138 and 148, and 139 and 149 respectively.

The contactor 30 is connected through the switching disc 19 to the positive side of the source by a conductor. The contact pieces 179 and 170 are respectively connected by conductors to one side of the coils of electromagnetic devices 39 and 40, said coils respectively operating cores 39' and 40' secured to the ends of a belt shifter 41. The belt shifter controls the operation of the main spindle 42 of the lathe (Fig. 1). The other sides of the coils are arranged so as to be alternately grounded to the body of the lathe or connected to the negative side of the source by means of contacts 43 and 44 and a contactor 45 cooperating with said contacts. One end of the contactor is pivotally connected at 46 so that the other end may engage the contact 43 or 44 when the shifter is operated. The contactor 30 is connected to the positive side of the source S by a conductor, the negative side being connected to the body of the lathe by a conductor.

With the switching discs 20 and 21, the connections of the contact pieces 180, 183, 187, 188, 190, 193, 197 and 198 are such that shown in Fig. 3, in which 11 represents the motor with an armature coil 47 and field coils 48 and 49 for moving the tool post 4 as stated hereinbefore, 16 represents the clutch device for connecting and disconnecting the worm shaft 14 with the shaft 15 of the motor 11, 61 represents an electromagnetic device for actuating an armature 62, whereby the clutch device may be actuated, and 50 represents an electromagnet device for actuating an armature 50' to disconnect the circuit of the electromagnet device 61. The contactor 32 and the armature 50' are grounded to the body of the lathe or connected to the negative side of the source S by conductors. One end of the field coil 48 and one end of the coil of the electromagnet device 61 are connected to the positive side of the source S. The contactor 31 is connected to one end of the field coil 49.

With the switching discs 22 and 23, the connections of the contact pieces 201, 202, 204, 206, 209, 211, 212, 214, 215, 216 and 219 are such as shown in Fig. 3, in which 5 represents the motor having an armature coil 51 and field coils 52 and 53 for moving the cross slide 3 as stated hereinbefore; 10 represents the clutch device for connecting and disconnecting the worm shaft 8 with the shaft 9 of the motor 5; 54 represents an electromagnet device for actuating an armature 55 whereby the clutch device may be actuated; and 56 represents an electromagnet device for actuating an armature 57 to disconnect the circuit of the electromagnet device 54. The contactor 34 and the armature 57 are grounded to the body of the lathe or connected to the negative side of the source S. One end of the field coil 52 and one end of the coil of the electromagnet device 54 are connected to the positive side of the source S. The contactor 33 is connected to one end of the field coil 53.

With the switching disc 24, the contactor 35 is connected to the positive side of the source S by a conductor, and the contact piece 229 is connected to one side of the actuating coil 58' of a counter 58, the other side being mounted to the body of the lathe or connected to the negative side of the source by a conductor.

With the switching disc 25, the contactor 36 is connected to the positive side of the source S by a conductor, and the contact piece 230' is grounded to the body of the lathe or connected to the negative side of the source by a conductor through a pilot lamp 59 inserted therein.

*Second position of contactors—first transverse feed of tool holder*

In Figs. 3 and 3A, parts are shown in an inoperative position, the contactors 29 through 36 being in their first position. In operation, a workpiece, such as a cylindrical body to be turned, is attached to the main spindle 42 of the lathe, and then the starting key 38 is temporarily depressed, whereby the circuit for energizing the magnet 37 conducts a current from the positive side of the source, through the coil of the magnet 37, the contactor 29, contact piece 160', the key 38 to ground on the body of the lathe or negative side of the source. The magnet 37 operates the armature 37', whereby the pawl 28 is actuated to advance the ratchet wheel 27 one tooth. The contactors 29 through 36 are thereupon moved from the respective contact pieces on which the contactors are positioned in Figs. 3 and 3A to corresponding second contact pieces, such as 160, 170, 180, 190, and the other idle contact pieces in clockwise direction.

Belt shifter

The circuit for energizing the magnet 40 thereupon conducts a current from the positive side of the source S through the contactor 30 on the disc 19, contact piece 170, the coil of the magnet 40, contact 43, contactor 45 to ground on the body of the lathe or the negative side of the source. The magnet 40 operates the core 40' to move the belt shifter 41 to the right in Fig. 3, whereby the main spindle 42 of the lathe is set in motion. While the belt is shifted, the contactor 45 is swung from the contact 43 into engagement with the contact 44, thus breaking the above-mentioned circuit and de-energizing the magnet 40. With contacts 43 and 44 in engagement, one of the switches in a stopping circuit, to be described later, is closed. This latter circuit will not be completed, however, until another switch comprising contacts 30 and 179 is closed.

Circuit for motor 11

At the same time, the circuit for energizing the field coils 48, 49 and the armature coil 47 of the motor 11 conducts a current from the positive side of the source S, through the coils 48 and 49, the contactor 31 and contact piece 180 on the disc 20, the armature coil 47, contact piece 190, contactor 32 on the disc 21 and to ground on the body of the lathe or the negative side of the source, whereby the motor 11 is driven in normal direction.

Circuit for clutch 16

At the same time, the circuit for energizing the magnet 50 conducts a current from the contact piece 180 on the disc 20, through the coil of the magnet 50 to ground on the body of the lathe or the negative side of the source. Upon energization of the magnet 50, at the armature 50', the circuit for energizing the magnet 61 is interrupted to release the armature 62, said circuit extending from the positive side of the source S through the coil of the magnet 61, the armature 50' to the ground on the body of the lathe or the negative side of the source. Thereupon, the clutch device 16 is coupled by means of a compression spring 16' to connect the worm shaft 14 to the motor shaft 15. The tool post 4 is thereupon transversely fed by the motor 11 through means of the worm shaft 14, worm wheel 13, and feed shaft 12.

Third position of contactors—first cross feed of tool holder

When the tool post 4 is moved to the cutting position near one end of the workpiece to be turned, the contact element 140 engages with associated contact element 130 of the contact maker set, and the energizing circuit of the magnet 37 flows from the positive side of the source S, through the coil of the magnet 37, contactor 29 and contact piece 160, contact maker set 130, 140 to ground on the body of the lathe or the negative side of the source. Magnet 37 operates to advance the ratchet wheel 27 another tooth and to rotate the shaft 26 to bring the contactors 29 through 36 into engagement with the corresponding third contact pieces, that is, to bring the contactors 29, 33 and 34 into operative engagement with corresponding contact pieces 161, 201 and 211, and to bring the other contactors into engagement with corresponding idle contact pieces.

The circuit of the motor 11 is thereupon interrupted, and the motor stops, and at the same time the magnet 50 de-energizes to close the circuit for energizing the magnet 61 at the armature 48. The magnet 61 operates thereupon to uncouple the clutch device 16 against the spring 16' by means of the armature 49. The traverse feed of the tool post 4 thereupon discontinues.

Circuit for motor 5

At the same time, the circuit for energizing the field coils 52, 53 and the armature coil 51 conducts a current from the positive side of the source S, through field coils 52 and 53, contactor 33 and contact piece 201 on disc 22, armature coil 51, contact piece 211, contactor 34 on disc 23, and to the ground on the body of the lathe or the negative side of the source. The motor 5 is thereby driven in normal direction.

Circuit for clutch 10

At the same time, the circuit for energizing magnet 56 conducts a current from contact piece 201 on disc 22, through the coil of magnet 56 to ground on the body of the lathe or the negative side of the source. Upon energization of magnet 56, at armature 57, the circuit for energizing magnet 54 is interrupted to release the armature 55, said circuit extending from the positive side of the source S through the coil of magnet 54, armature 57 to the ground on the body of the lathe or the negative side of the source. The clutch device 10 thereupon is coupled by means of compression spring 10' to connect the worm shaft 14 to the motor shaft 15. The cross slide 3 and tool post 4 are thereupon cross fed by means of motor 5, the worm shaft 8, the worm wheel 7 and feed shaft 6, whereby the end of the workpiece is cut.

Fourth position of contactors—reversal of cross feed

At the end of the cutting, contact element 141 will engage with associated contact element 131, and the circuit for energizing magnet 37 conducts a current from the positive side of the source S, through the coil of magnet 37, contactor 29 and contact piece 161 on disc 29, contact maker set 131 and 141 to the ground on the body of the lathe or the negative side of the source. Magnet 37 operates to advance the ratchet wheel 27 another tooth and thereby rotate the shaft 26 to bring contactors 29 through 36 into engagement with corresponding fourth contact pieces, that is, contactors 29, 33 and 34 are brought into engagement with corresponding operative contact pieces 162, 202 and 212 and the other contactors into engagement with corresponding idle contact pieces. The circuit for the motor 5 thereupon conducts a current from the positive side of the source S, through field coils 52 and 53, contactor 33 and contact piece 202 on disc 22, armature coil 51, contact piece 212, contactor 34 on disc 23, and to the ground on the body of the lathe or the negative side of the source. The motor 5 thereupon is driven in reverse direction due to reversal of the current flowing through armature coil 51 of the motor 5.

At the same time, the circuit for energizing magnet 56 conducts a current from contact piece 202 on disc 22, through armature coil 51, the coil of magnet 56, and to the ground on the body of the lathe or the negative side of the source. Upon energization of magnet 56, the armature 57 interrupts the circuit for energizing magnet 54 to release armature 55 in a manner previously described. The clutch device 10 is thereupon coupled by means of compression spring 10' to connect the worm shaft 14 to the motor shaft 15.

*Fifth position of contactors—second transverse feed of tool holder*

The cross slide 3 is thereupon cross fed back with the tool post 4; and, when contact element 142 engages with associated contact element 132 the circuit, the circuit for energizing magnet 37 conducts a current from the positive side of the source S, through the coil of magnet 37, contactor 29 and contact piece 162 on disc 29, contact maker set 132 and 142 to the ground on the body of the lathe or the negative side of the source. Magnet 37 operates and the ratchet wheel 27 is stepped one tooth to rotate the shaft 26 to bring contactors 29 through 36 into engagement with corresponding fifth contact pieces, that is, contactors 29, 31 and 32 are moved into engagement with corresponding operative contact pieces 163, 183 and 193 and the other contactors moved into engagement with corresponding idle contact pieces. The circuit of the motor 5 is thereupon interrupted and the clutch device 10 is uncoupled, so that the back cross feed of the cross slide 3 discontinues.

At the same time, the circuit of the motor 11 for driving in normal direction extends as hereinbefore traced, excepting contact pieces 180 and 190 being replaced with contact pieces 183 and 193 respectively, and at the same time the circuit for energizing the magnet 50 conducts a current from contact piece 183 on disc 20, through the coil of magnet 50, to the ground on the body of the lathe or the negative side of the source.

The motor 11 is thereupon driven in normal direction and the clutch device 16 is coupled, so that the tool post 4 is transversely fed.

*Sixth position of contactors—second cross feed of tool holder*

When the tool post 4 is transversely fed to a predetermined position along the workpiece, contact element 143 will engage with associated contact element 133. Similarly to the above stated manner, the circuit of magnet 37 is closed, and the magnet operates to advance the ratchet wheel 27 one tooth, whereby the shaft 26 is rotated to bring contactors 29 to 36 into engagement with corresponding sixth contact pieces, that is, contactors 29, 33 and 34 are moved into engagement with operative contact pieces 164, 204 and 214 respectively, and the other contactors into engagement with corresponding idle contact pieces.

Obviously, the circuit of the motor 11 is thereupon interrupted, the clutch device 16 uncoupled, and the transverse feed of the tool post 4 discontinued, while the circuit of the motor 5 is closed to drive the motor in normal direction, and clutch 10 coupled, whereby the cross slide 3 and hence the tool post 4 are cross fed to cut the workpiece a second time.

*Seventh position of contactors—second reversal of cross feed*

At the end of cutting of the workpiece to predetermined size, contact elements 141 will engage with the associated contact element 131 and, obviously, the circuit of magnet 37 is closed, and the magnet operates to advance the ratchet wheel 27 one tooth, whereby the shaft 26 is rotated to bring contactors 29 through 36 into engagement with the corresponding seventh contact pieces, that is, contactors 29, 33 and 34 are brought into engagement with operative contact pieces 165, 205 and 215 respectively, and the other contactors are moved into engagement with corresponding idle contact pieces.

*Eighth position of contactors*

Obviously, the circuit of the motor 5 is closed to rotate the motor in reverse direction, and the cross slide 3 is thereupon cross fed back with the tool post 4 until contact element 142 engages associated contact element 132. Obviously, the circuit of magnet 37 is thereupon closed to advance the ratchet wheel 27 one tooth, whereby the shaft 26 is rotated to bring contactors 29 through 36 into engagement with corresponding eighth contact pieces, that is contactors 29, 33 and 34 are brought into engagement with contact pieces 166, 206 and 216 respectively, and the other contactors are moved into engagement with corresponding idle contact pieces.

Obviously, the circuit of the motor 5 is closed to rotate the motor in normal direction, and the cross slide 3 is cross fed with the tool post 4 until the tool post is in predetermined position opposite the workpiece.

*Ninth position of contactors*

Then contact element 146 engages with associated contact element 136, whereby the circuit of magnet 37 is closed and the ratchet wheel 27 is stepped one tooth to rotate the shaft 26 to bring contactors 29 through 36 into engagement with corresponding ninth contact pieces, that is, contactors 29, 31 and 32 are brought into engagement with contact pieces 167, 187 and 197 respectively, and the other contactors are brought into engagement with corresponding idle contact pieces.

As in the preceding case, the circuit to motor 5 is broken and the circuit to motor 11 is completed, thereby effecting another transverse feed of the tool post.

*Tenth position of contactors*

Then contact element 147 engages with associated contact 137 and, obviously, the circuit of magnet 37 is closed to advance the ratchet wheel 27 one tooth to rotate the shaft 26 to move contactors 29 through 36 into engagement with corresponding tenth contact pieces, that is, contactors 29, 31 and 32 are moved into engagement with operative contact pieces 168, 188 and 198 respectively, and the other contactors are brought into engagement with corresponding idle contact pieces. The circuit of the motor 11 is obviously closed to reversely rotate the motor, whereby the tool post 4 is transversely fed back until contact element 148 engages the associated contact element 138.

*Eleventh position of contactors*

Then the circuit of magnet 37 is again closed to advance the ratchet wheel 27 one tooth to rotate the shaft 26 to move contactors 29 through 36 into engagement with corresponding eleventh contact pieces, that is, contactors 29, 30, 33, 34 and 35 are moved into engagement with operative contact pieces 169, 179, 209, 219 and 229 respectively, and the other contactors are moved into engagement with corresponding idle contact pieces.

Obviously, the circuit of the motor 11 is thereupon interrupted and the clutch device 16 is uncoupled to discontinue the transverse back feed of the tool post 4, while the circuit of the motor 5 is closed to rotate the motor in reverse direction, and the clutch device 10 is coupled, whereby the cross slide 3 and hence the tool post 4 are cross fed back. Furthermore, magnet 39 is energized by current passing through the circuit extending from the positive side of the source S, through contactor 30, and contact piece 179 on the disc 19, the coil of magnet 39, contact 44, contactor 45 operated as hereinbefore stated, and to the ground on the body of the lathe or the negative side of the source. Magnet 39 operates core 39' to move the belt shifter 41 to the left, that is, the original position in Fig. 3, whereby the motion of the main spindle 42 of the lathe is discontinued.

Magnet 58' is also energized by current passing through the circuit extending from the positive side of the source S, through contactor 35, contact piece 229 on the disc 24, the coil of the magnet 58' and to the ground on the body of the lathe or the negative side of the source, whereby one working cycle number is added in the counter 58.

Thus, the cross slide 3 and hence the tool post 4 are cross fed back to return to the original position as just above stated. When contact element 149 engages the associated contact element 139, the circuit of magnet 37 is again closed to advance the ratchet wheel 27 one tooth, whereby the shaft 26 is rotated to bring contactors 29 through 36 into engagement with corresponding first or original contact pieces, that is, contactors 29, 30 and 36 are moved into engagement with operative contact pieces 160', 170' and 230' respectively, and the other contactors are moved into engagement with corresponding idle contact pieces. In the last named position of the contactors, the pilot lamp 59 is lighted through the circuit extending from the positive side of the source S, through contactor 36, contact piece 230' on disc 25, the lamp 59, and to the ground on the body of the lathe or the negative side of the source. A cycle of turning a workpiece is thus completed, and the parts are restored to position as shown in Figs. 3 and 3A.

The invention is not intended to be limited to the exact embodiment herein selected for purposes of illustration, but should be regarded as covering modifications and variations thereof without departing from the scope of the invention.

I claim:

1. In apparatus for electrically controlling the operation of machine tools, a tool post, an electric motor for moving the tool post relative to a workpiece, a rotatable shaft, a plurality of discs of insulating material mounted on said shaft, circumferentially spaced contacts on each disc, means for rotating said shaft to a first position, means including an electrical circuit through a contact of one of said discs in the first position thereof for initiating rotation of the workpiece, a supply circuit for said motor including a contact of another of said discs in the first position thereof whereby said motor is operated to move said tool post relative to the workpiece, a limit switch actuated upon predetermined movement of the tool post, a circuit including said limit switch and a contact of another of said discs for operating said first mentioned means to rotate said shaft and said discs to another position for interrupting said supply circuit to said motor.

2. Apparatus for electrically controlling the operation of machine tools comprising, a tool post, an electric motor for moving the tool post relative to a workpiece, a rotatable shaft, a plurality of discs of insulating material mounted on said shaft, circumferentially spaced contacts on each disc, means including an electrical circuit through a contact of one of said discs in the inoperative position thereof for rotating said shaft to a first operative position, means including an electrical circuit through a contact of another of said discs in the first operative position thereof for initiating rotation of the workpiece, a supply circuit for said motor including a contact of another of said discs in the first operative position thereof whereby said motor is operated to move said tool post relative to the workpiece, switch means closed by movement of the tool post to a predetermined position, a circuit including said switch means and a second contact of the first mentioned disc in the first operative position thereof for operating the first mentioned means to rotate said shaft and said discs to a second operative position for interrupting the supply circuit to said motor.

3. Apparatus for electrically controlling the operation of machine tools comprising, a tool post, an electric motor for moving the tool post relative to a workpiece, a rotatable shaft, a plurality of discs of insulating material mounted on said shaft, circumferentially spaced contacts on each disc, means including an electrical circuit through a contact of one of said discs in the inoperative position thereof for rotating said shaft to a first operative position, means including an electrical circuit through a contact of another of said discs in the first operative position thereof for initiating rotation of the workpiece, a supply circuit for said motor including a contact of another of said discs in the first operative position thereof whereby said motor is operated to move said tool post relative to the workpiece, switch means closed by movement of the tool post to a predetermined position, a circuit including said switch means and a second contact of the first mentioned disc in the first operative position thereof for operating the first mentioned means to rotate said shaft and said discs to a second operative position for interrupting the supply circuit to said motor, a second motor for moving the tool post in another direction relative to the workpiece, a supply circuit for said second motor including a contact of another of said discs in the second operative position thereof whereby said second motor is operated to move the tool post relative to the workpiece, a limit switch actuated upon predetermined movement of the tool post by operation of the second motor, and a circuit including said limit switch and a contact of the first mentioned disc in the second operative position thereof for operating said first mentioned means to rotate said shaft to another position for interrupting the supply circuit to the second motor.

4. In apparatus for electrically controlling the operation of a machine tool, a tool post movable relative to a workpiece, an electric motor for moving the tool post, a rotatable shaft, a plurality of discs of insulating material mounted on said shaft, circumferentially spaced contacts on each disc, a ratchet mechanism associated with said shaft, an electromagnet for actuating said ratchet mechanism to rotate the shaft, an electrical supply circuit for said electromagnet including a contact of one of said discs in the initial position thereof for actuating the ratchet mechanism to rotate said disc to a first position, a supply circuit for said motor including a contact of another of said discs in said first position thereof whereby said motor is operated to move said tool post, a limit switch actuated upon predetermined movement of said tool post, a circuit including said limit switch and a second contact of said first disc for operating said electromagnet to rotate said shaft and said discs to a third position for interrupting the supply circuit to said motor.

5. In apparatus for electrically controlling the operation of a machine tool, a tool post, an electric motor for moving said tool post relative to a workpiece, a rotatable shaft, a plurality of discs of insulating material mounted on said shaft, circumferentially spaced contacts on each insulating disc, means for rotating said shaft to a first position including an electrical circuit through a contact of one of said discs in the initial position thereof, a supply circuit for said motor including a contact of another of said discs in the first position thereof whereby said motor is operated to move said tool post relative to said workpiece, a limit switch actuated upon predetermined movement of the tool post, and a circuit including said limit switch and a contact of the first mentioned disc in the second position thereof for operating said first mentioned means to rotate said shaft to a second position for interrupting the supply circuit to said motor.

HIDEZO TUTIYA.